(No Model.)
W. MAY.
Hand Truck.
No. 232,197. Patented Sept. 14, 1880.
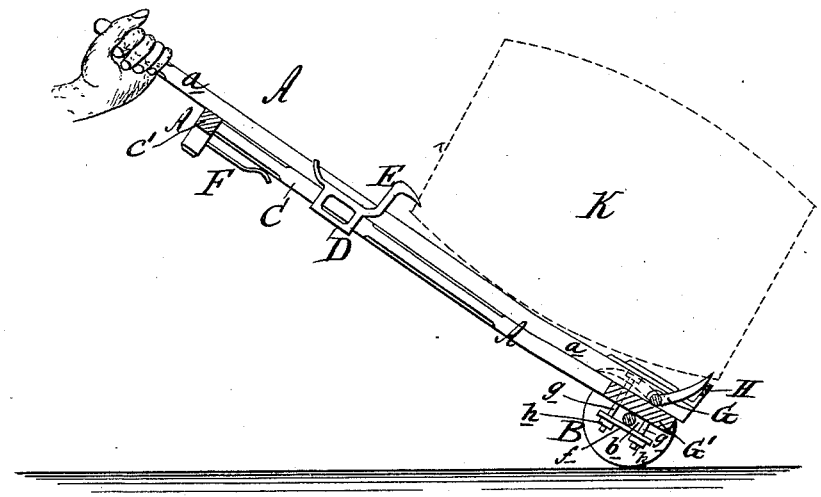
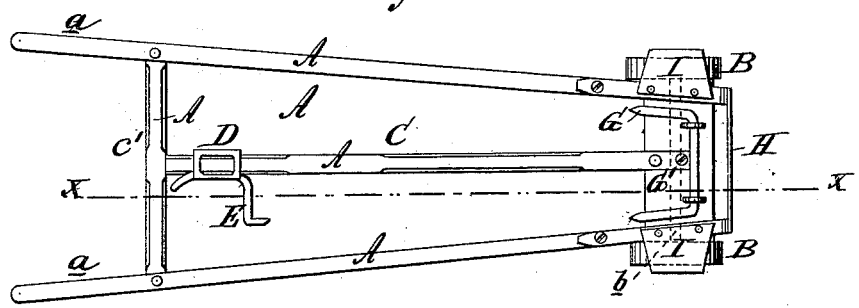
WITNESSES:
A. Schehl.
C. Sedgwick
INVENTOR:
W. May
BY Munn & Co
ATTORNEYS.

UNITED STATES PATENT OFFICE.

WILLIAM MAY, OF BINGHAMTON, NEW YORK.

HAND-TRUCK.

SPECIFICATION forming part of Letters Patent No. 232,197, dated September 14, 1880.

Application filed June 9, 1880. (No model.)

*To all whom it may concern:*

Be it known that I, WILLIAM MAY, of Binghamton, in the county of Broome and State of New York, have invented a new and Improved Hand-Truck, of which the following is a specification.

The object of this invention is to provide an improved hand-truck for taking hold of and carrying barrels, boxes, bales, &c.

The invention is an improvement on the hand-truck for which Letters Patent No. 74,107 were granted to me February 4, 1868; and it consists of a double hook hinged on the lower part of the truck-frame, so that it may be thrown up or open to rest upon the toe or end cross-bar of the device and operate, in combination with a hook that slides on the central longitudinal bar of the truck, to take hold of and hold a barrel, cask, or large box, the said double hook being so hinged that it can be turned or folded down for the purpose of adapting the hand-truck for the conveyance of bags or other articles that might be injured by contact with them, and the sliding hook being so arranged that it may be rotated or turned aside, and held by a spring or other device, so as not to interfere with bales or bags, &c., carried on the truck.

Figure 1 is a sectional side elevation on line $x\ x$, Fig. 2, representing the truck carrying a cask. Fig. 2 is a plan of the truck.

Similar letters of reference indicate corresponding parts.

In the drawings, A represents a truck-frame resting on wheels B B, and having handles $a\ a$, which project in the required straight or curved line from the toe H, which is secured on the lower ends of the said handles $a\ a$. The wheels B B are journaled on the axle $b$, which is secured to the frame A by the clips $f$ and bolts $g\ g$, which latter pass down through the arms $a\ a$ and through the ends of the cross-plate G', which forms part of the frame A, and through the clips $f$, and have nuts $h\ h$ turned on their ends.

C is the central longitudinal bar of the truck, forming part of the frame A thereof, said bar C having its lower end connected with the cross-plate G', and its upper end with the upper cross-bar, C', on which bar C is arranged a sliding sleeve, D, to the upper face of which sleeve D a hook, E, is secured, with prong pointing downward toward the toe H, as shown. Instead of being attached to a sliding sleeve, this hook E may be otherwise arranged to slide on the bar C. The sleeve D, with the hook E, can also be made to turn or rotate on the bar C, so that said hook E may be turned aside, as shown in Fig. 2, when not required for holding casks, boxes, &c. To the upper end of the bar C is secured a spring, F, or other equivalent device for locking the said hook E in position.

G represents the double hook, hinged to the lower part of the truck-frame, preferably on the cross-plate G', in such a manner that it can be thrown up or open to rest on the toe or end cross-bar, H, of the truck, with its prongs extending outward and upward for engagement with the lower part of a cask, box, barrel, &c., that is to be tipped on the said truck for transportation, and said hook G may also be folded down or back, as shown in Fig. 2, so that its points may not interfere with bags, bales, or other goods that might otherwise be injured by their contact.

I I are the usual guards, extending from the truck-frame A over the wheels B B, to keep said wheels B B from contact with the goods on the truck.

The operation of the device is as follows: For taking up a cask, barrel, or large box, the truck is brought in nearly an upright position, with the hinged hook G thrown up or open against the side of the said cask, barrel, or box. The lower part of the truck is then forced forward, so that the points of the said hook G shall engage in the article to be moved. The sliding and rotating hook E is then moved down to catch into the chine or top of said cask, barrel, or box, and the truck can then be tipped and moved with the article firmly held on it, as indicated in Fig. 1, wherein K represents a cask. The heavier the article to be moved is the more firmly will it be held by the hooks G E. For carrying bags, bales, &c., the hook G will be turned or folded down, as shown in Fig. 2, and the hook E be turned aside, as shown in the same Fig. 2, the toe H serving in such cases to hold the goods upon the truck.

I am aware that a truck having a sliding but non-rotating hook on the upper part of the handle is not new; but such hook is found to interfere with the goods when other goods than casks, barrels, and large boxes are carried on the truck; and I am aware that fixed hooks on the extreme end of the truck have been used in combination with a hinged plate or bar that may be thrown down on said fixed hooks; but such arrangement is also defective, inasmuch as the points of the fixed hooks quickly become blunted by the contact of the hinged plate or bar, and inasmuch as the combination of the fixed toe-piece and adjustable hook is preferable to the combination of adjustable toe-piece and fixed hook for convenience of taking hold of barrels, casks, and large boxes, &c.

Having thus described my invention, what I claim as new, and desire to secure by Letters Patent, is—

1. A hand-truck consisting of the frame A, the sliding rotating hook E, the double hook hinged on cross-plate G', the toe H, and wheels B, all substantially as shown and described.

2. In a hand-truck, the combination, with the cross-plate G' and fixed double-hook-supporting toe H, of the hinged double hook G, substantially as herein shown and described.

WILLIAM MAY.

Witnesses:
I. I. STORER,
C. SEDGWICK.